US008708022B2

(12) United States Patent
Hosono et al.

(10) Patent No.: US 8,708,022 B2
(45) Date of Patent: Apr. 29, 2014

(54) LABEL PEELING UNIT AND LABEL PRINTER

(75) Inventors: Shinichiro Hosono, Tokyo (JP); Kenta Kano, Tokyo (JP)

(73) Assignee: Sato Holdings Kabushiki Kaisha (JP)

( * ) Notice: Subject to any disclaimer, the term of this patent is extended or adjusted under 35 U.S.C. 154(b) by 455 days.

(21) Appl. No.: 12/523,751

(22) PCT Filed: Dec. 27, 2007

(86) PCT No.: PCT/JP2007/075071
§ 371 (c)(1), (2), (4) Date: Jul. 20, 2009

(87) PCT Pub. No.: WO2008/087842
PCT Pub. Date: Jul. 24, 2008

(65) Prior Publication Data
US 2010/0089535 A1 Apr. 15, 2010

(30) Foreign Application Priority Data
Jan. 19, 2007 (JP) ................................ 2007-010159

(51) Int. Cl.
*B32B 38/10* (2006.01)

(52) U.S. Cl.
USPC ........... 156/759; 156/715; 156/719; 156/764; 156/767; 101/37; 101/41; 101/57; 101/78; 101/93; 101/287; 101/288

(58) Field of Classification Search
None
See application file for complete search history.

(56) References Cited

U.S. PATENT DOCUMENTS

| | | | | |
|---|---|---|---|---|
| 3,489,084 | A * | 1/1970 | Culbertson et al. | 101/287 |
| 3,631,964 | A * | 1/1972 | Hinman et al. | 198/789 |
| 3,893,664 | A * | 7/1975 | Thomsen | 271/100 |
| 4,490,206 | A * | 12/1984 | Makley | 156/384 |
| 4,498,389 | A * | 2/1985 | Hamisch, Jr. | 101/288 |
| 8,231,760 | B2 * | 7/2012 | Murakami et al. | 156/711 |

FOREIGN PATENT DOCUMENTS

| | | |
|---|---|---|
| JP | 164110/1986 | 10/1986 |
| JP | 164407/1988 | 10/1988 |
| JP | 8-295323 A | 11/1996 |
| JP | 11-029125 A | 2/1999 |
| JP | 7-132919 A | 5/2003 |

OTHER PUBLICATIONS

International Search Report dated Apr. 8, 2008, issued in corresponding international application No. PCT/JP2007/075071.

* cited by examiner

*Primary Examiner* — Mark A Osele
*Assistant Examiner* — Nickolas Harm
(74) *Attorney, Agent, or Firm* — Ostrolenk Faber LLP

(57) ABSTRACT

A label peeling unit having an installation body: a movable body movable while engaging with the installation body and stopping in a closed state or an open state in which the movable body is closed or open relative to the installation body; a label peeling body installed on the movable body and allowing backing paper of a continuous label body, which is conveyed by the paper sheet conveyance device, to be in contact with the label peeling body to bend the backing paper for peeling a part of a label off the backing paper; and a backing paper conveyance roller rotatably installed on the movable body and rotating while being in contact with a platen roller of the paper sheet conveyance device with the backing paper in between to thereby convey the backing paper and discharge it to the outside. The label peeling unit facilitates loading of paper sheets.

7 Claims, 7 Drawing Sheets

LABEL PEELING UNIT AND LABEL PRINTER

CROSS REFERENCE TO RELATED APPLICATION

The present application is a 35 U.S.C. §§371 national phase conversion of PCT/JP2007/075071, filed Dec. 27, 2007, which claims priority of Japanese Application No. 2007-010159, filed Jan. 19, 2007, incorporated by reference herein. The PCT International Application was published in the Japanese language.

TECHNICAL FIELD

Background Art

In a label printer, a continuous label strip (hereinafter also referred to as a "paper sheet") in which labels with a predetermined length are adhered removably to a long strip-shaped mount sheet (separator) at regular intervals, for example, is used as a print medium. The paper sheet is conveyed by platen rollers, and the labels are printed using a thermal head provided so as to oppose the platen rollers across the paper sheet. Moreover, in some cases, printed labels are automatically peeled off from the mount sheet using a label peeling mechanism (label peeling unit).

As a related technology, a paper label peeling apparatus that can be fitted to an existing thermal printer is disclosed in Patent Document JP-A-7-132919 (p. 1, FIG. 1). In this paper label peeling apparatus, a pressure roller, a feed roller, and a capstan roller are rotatably supported onto a frame by shafts. The pressure roller and the feed roller are coupled to each other by a gear, and the feed roller and the capstan roller are brought into contact with each other by an appropriate pressing force. A peeling part is provided so as to oppose the feed roller, and the pressure roller is in contact with a platen of the thermal printer. This paper label peeling apparatus makes it possible to use an existing thermal printer as a label printer. Moreover, it is described that it is possible to drive the paper label peeling apparatus without necessitating a dedicated drive source, such as a motor, or a control circuit by firmware.

A problem with the paper label peeling apparatus of this Patent Document, however, is that it is difficult to insert the paper sheet through the paper label peeling apparatus because the locations of the peeling part for peeling labels and the rollers for conveying the paper sheet are close to each other.

SUMMARY OF THE INVENTION

Objects of the Invention

In view of the foregoing point, it is an object of the invention to make easy inserting of paper sheets in a label peeling unit fitted to a label printer or the like and used for peeling labels from a mount sheet. It is also an object of the invention to provide a label printer in which such a label peeling unit is fitted.

Description of the Invention

In order to solve the foregoing problems, the invention provides, in accordance with one aspect thereof, a label peeling unit fitted to a paper sheet conveying device for conveying a continuous label strip in which labels are adhered removably on a mount sheet. The unit is used for peeling the labels. The label peeling unit comprises the following elements. An attachment body is attached to a case of the paper sheet conveying device. A movable body is movable while engaging the attachment body. The movable body is urged by a spring, whereby it stops in a closed state or in an open state with respect to the attachment body. A label peeling body is fitted to the movable body and is contacted by the mount sheet of the continuous label strip conveyed by the paper sheet conveying device so that the mount sheet is bent, to thereby peel a portion of a label from the mount sheet. A mount sheet conveying roller is attached to the movable body freely rotatably. The conveying roller rotates while being in contact with a platen roller of the paper sheet conveying device via the mount sheet, to thereby convey the mount sheet and discharge it outside.

In another aspect, the invention provides a label printer for conveying a continuous label strip in which labels are adhered removably to a mount sheet, and performing printing on the labels. The label printer comprises the following elements. A case in which an enclosing unit is formed for enclosing a continuous label strip coiled in a roll form. A platen roller is rotated and driven by a motor provided in the case, to thereby convey the continuous label strip. A print head prints on labels while sandwiching the continuous label strip between it and the platen roller. A front face cover is attached openably/closably to the case. A label peeling unit according to the invention is attached to the case within the front face cover.

Advantageous Effects of the Invention

According to the invention, a label peeling body for peeling labels and amount sheet conveying roller for conveying a mount sheet and discharging it outside are mounted to a movable body that is capable of parallel shifting and rotational shifting relative to an attachment body. Therefore, inserting of paper sheets is made easy in the label peeling unit.

DESCRIPTION OF PREFERRED EMBODIMENTS

Figure 1:
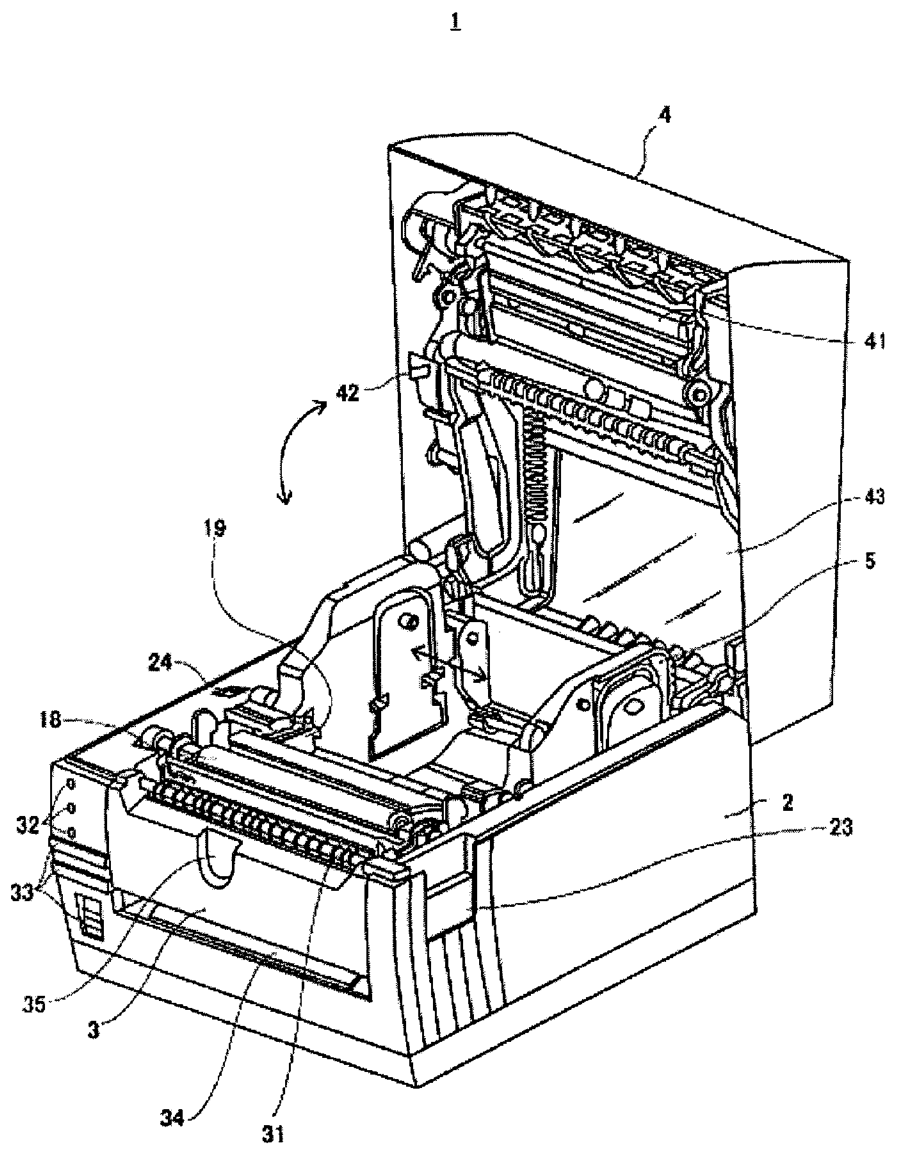
FIG. 1 is a perspective view showing the outline of a label printer in which a label peeling unit according to one embodiment of the invention is fitted.

Hereinbelow, embodiments of the invention are described with reference to the drawings. It should be noted that the same component parts are designated by the same reference numerals, and the explanations thereof will be omitted.

The label peeling unit according to the invention is used by being fitted in a label printer or the like in which a continuous label strip is conveyed and the labels are printed, or in a peeling device for conveying a continuous label strip and peeling the labels (these devices are referred to as "paper sheet conveying devices" in the present application). The following embodiments, however, describes the cases in which the label peeling unit is fitted and used in the label printer.

FIG. 1 is a perspective view showing the outline of a label printer in which a label peeling unit according to one embodiment of the invention is fitted. As shown in FIG. 1, a label printer 1 comprises a case 2, a paper sheet retaining mechanism 5 for freely rotatably retaining a paper roll in which a continuous label strip (paper sheet) is coiled in roll form, a platen roller 18 for conveying the paper sheet, a label sensor 19 for detecting the location of a label, and a front face cover 3 and an upper face cover 4 that are attached pivotably relative to the case 2, in the direction shown by the arrow.

A peeling roller 31 for pressing the surface of a paper sheet downward is attached rotatably to the front face cover 3, and in addition, the front face cover 3 is provided with a display unit 32 such as LEDs, an operation unit 33 such as operation keys, and a mount sheet discharge port 34 for discharging a mount sheet. A recessed portion 35 is formed in at least a portion of the front face cover 3 so that the labels can be easily removed.

A thermal head 41 and a detection protrusion 42 are attached to the upper face cover 4, and the upper face cover 4 is provided with a transparent window 43 for confirming the condition of the paper sheets.

The case 2 is provided with a cover-open/close lever 23 for opening/closing the upper face cover 4, and a cover-open/close sensor 24 for detecting opening/closure of the upper face cover 4. The cover-open/close sensor 24 includes a light-emitting element and a photodetector element. Because of blocking of light by the detection protrusion 42, it can detect that the upper face cover 4 is closed, so it is possible to prevent the printing operation from being performed when the upper face cover 4 is kept open (i.e., when the upper face cover 4 is not closed completely).

Figure 2:
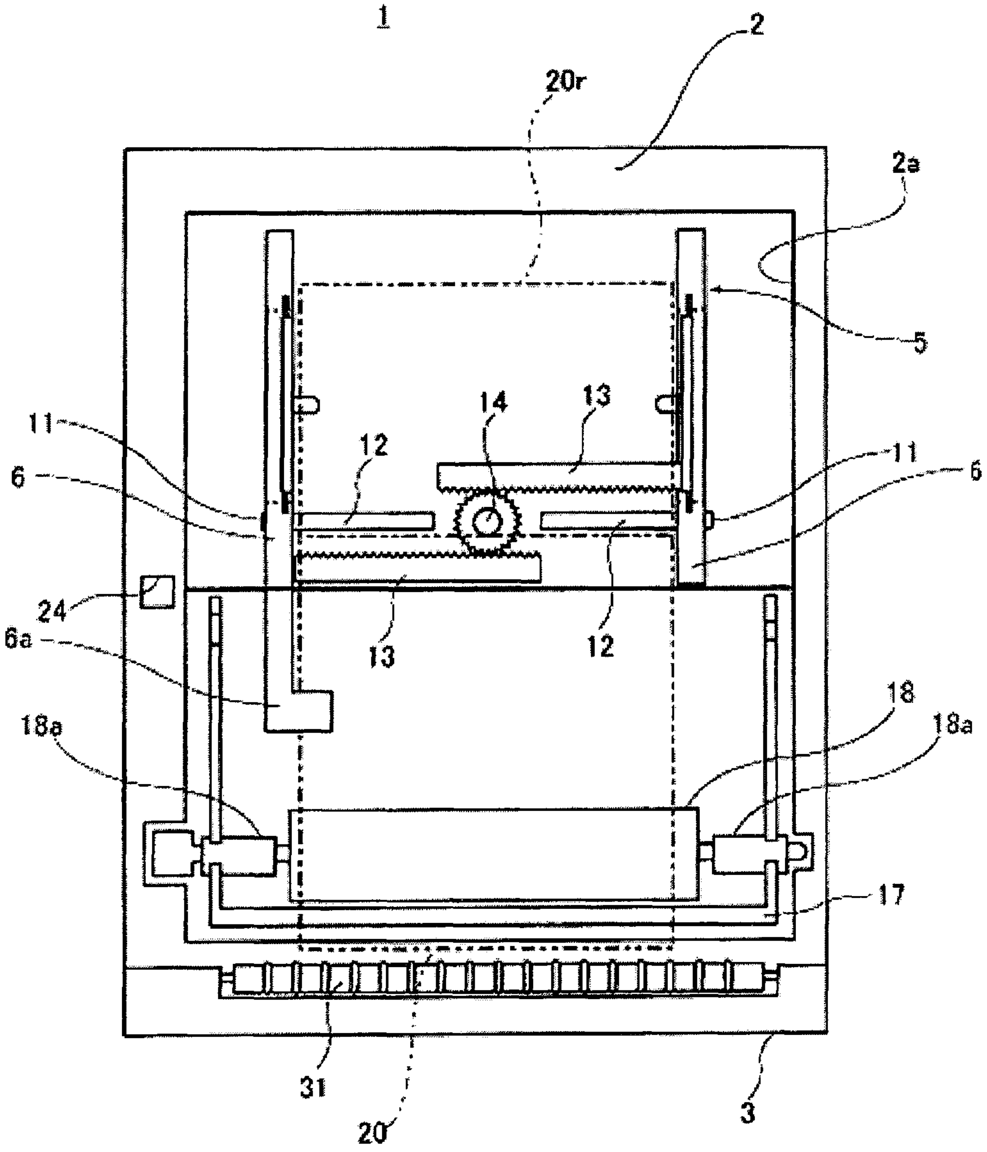
FIG. 2 is a plan view showing the structure of the main unit side of the label printer shown in FIG. 1.

FIG. 2 is a plan view showing the structure of the main unit side of the label printer shown in FIG. 1. A paper roll enclosing recess 2*a* for enclosing a paper roll 20*r*, in which a continuous label strip 20 is coiled in roll form, is formed in the case 2. The paper sheet retaining mechanism 5 is installed in the paper roll enclosing recess 2*a* so as to retain the paper roll 20*r* freely rotatably.

In the paper sheet retaining mechanism 5, two paper sheet side face guides 6 for restricting the location of the paper roll 20*r* along the width direction (shaft direction) are provided so that the locations thereof can be varied according to the width of the paper sheet. In addition, a paper sheet upper face guide 6*a* is formed integrally with at least one of the paper sheet side face guides 6. The paper sheet upper face guide 6*a* prevents fluttering of the paper sheet by pressing a widthwise end portion of the continuous label strip 20 that has been pulled out from the paper roll 20*r* downwardly, so as to make better the detection operation of the label sensor 19 (see FIG. 1), disposed at an opposite location across the continuous label strip 20.

Sliding members 11 along the widthwise direction of the paper roll 20*r* are provided integrally with the lower ends of the paper sheet side face guides 6, and these sliding members 11 are fitted respectively in a pair of guide grooves 12, which are formed in the bottom face of the paper roll enclosing recess 2*a*, freely slidably. Thereby, the two paper sheet side face guides 6 are allowed to be capable of shifting in the directions in which they approach each other or move away from each other, while keeping the parallel condition.

Two racks 13 are provided respectively for the two paper sheet side face guides 6, along the bottom face of the paper roll enclosing recess 2*a*, and a pinion 14 that meshes with these racks 13 is provided freely rotatably at a location at which the racks 13 face each other. As a result, when one of the paper sheet side face guides 6 is shifted a certain distance in a desired direction, the other one of the paper sheet side face guides 6 also shifts by the same distance in the opposite direction. An engaging protrusion (not shown) provided on the paper sheet side face guide 6 engages with an engaging groove (not shown) provided in the paper roll enclosing recess 2*a*, whereby the widthwise locations of the paper sheet side face guides 6 are determined.

In addition, a platen roller retaining portion 17 is attached to the case 2, and two platen roller bearings 18*a* are retained by the platen roller retaining portion 17, and the platen roller 18 is retained rotatably by these platen roller bearings 18*a*.

Figure 3:
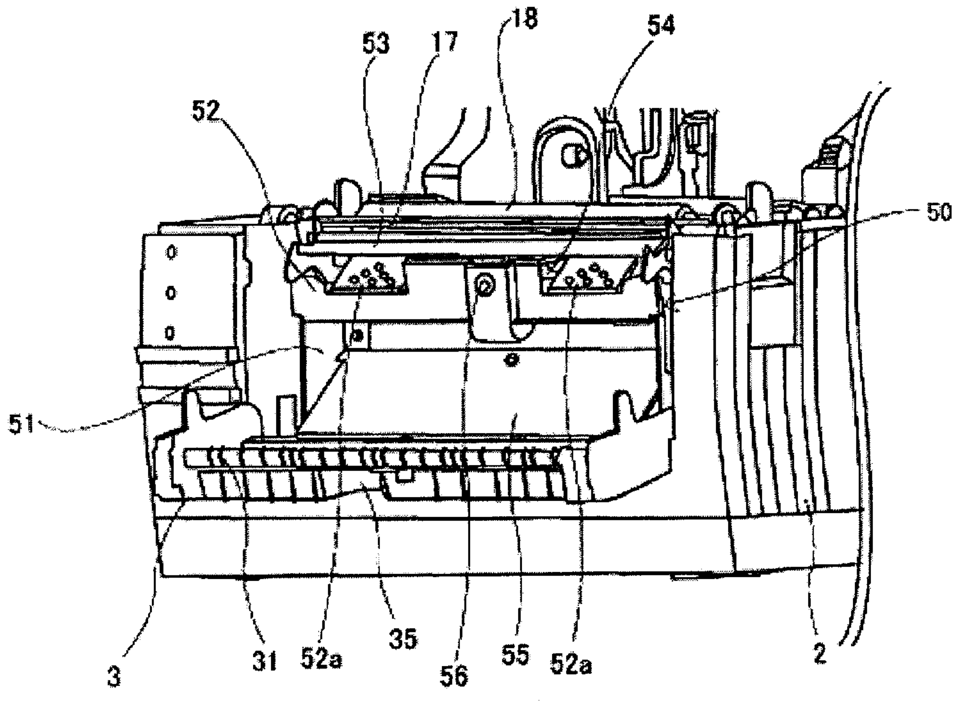
FIG. 3 is a perspective view showing the label peeling unit in the state in which a front face cover of the label printer shown in FIG. 1 is open.

FIG. 3 is a perspective view showing the label peeling unit in the state in which the front face cover of the label printer shown in FIG. 1 is open. A label peeling unit 50 has an attachment body 51 attached to the case 2 of the label printer by screw-fastening, a movable body 52 retained in such a condition as to be capable of parallel shifting and rotational shifting while engaging with the attachment body 51, a label peeling body 53 attached rotatably to the movable body 52, a mount sheet conveying roller 54 that is attached freely rotatably to the movable body 52 and is driven-rotated by making contact with the platen roller 18, which is rotation-driven by a motor that is not shown in the drawing, and a guide plate 55 located below the movable body 52 and attached freely rotatably to the attachment body 51.

By being urged by a spring, the movable body 52 can stop either in a closed state or in an open state with respect to the attachment body 51. In FIG. 3, the movable body 52 is in a closed state with respect to the attachment body 51. At least one pressing part that is pressed down when shifting the movable body 52 is provided integrally with the movable body 52. In FIG. 3, two pressing parts 52*a* are shown. By pressing down the pressing parts 52*a* toward the attachment body 51 side, the movable body 52 can be opened frontward.

Figure 4:
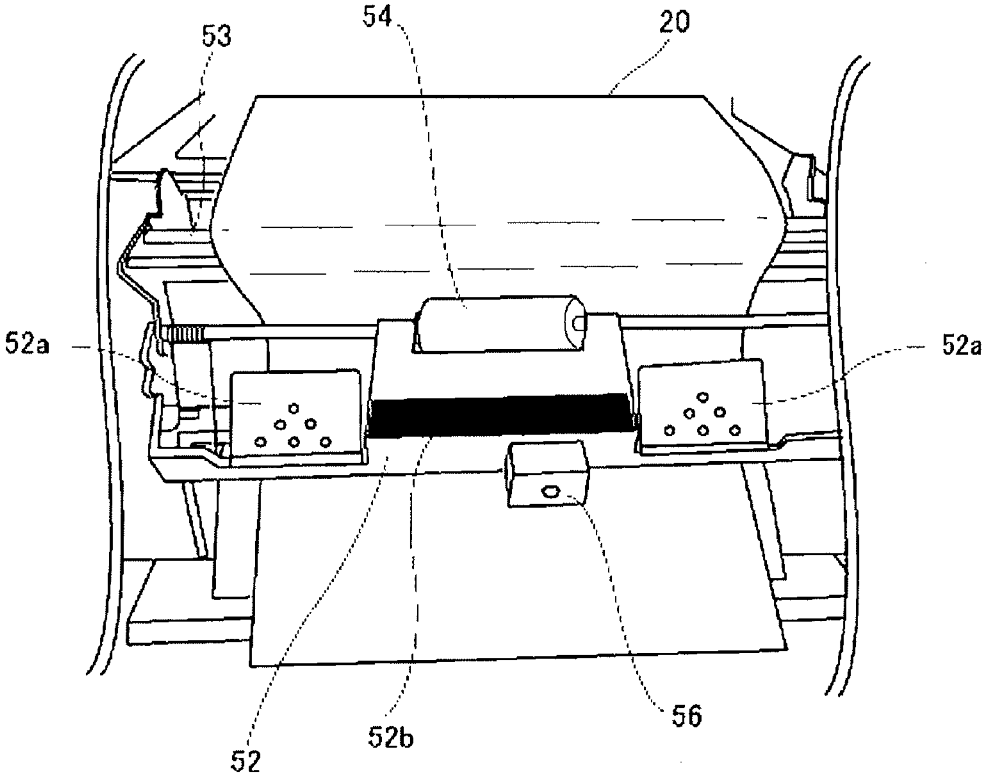
FIG. 4 is a view showing the state in which the front face cover and a movable body are open to load a paper sheet.
Figure 5A:
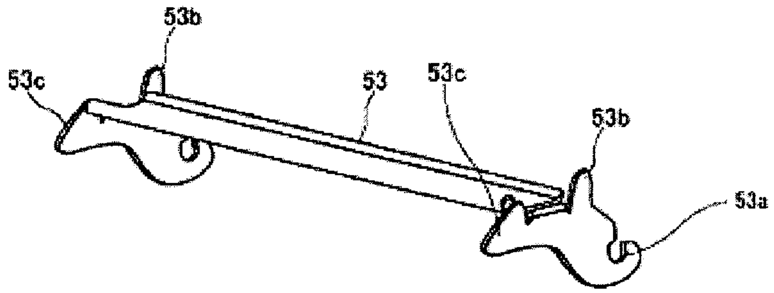
FIG. 5 is a perspective view showing component parts of the label peeling unit.
Figure 5B:
Figure 5C:
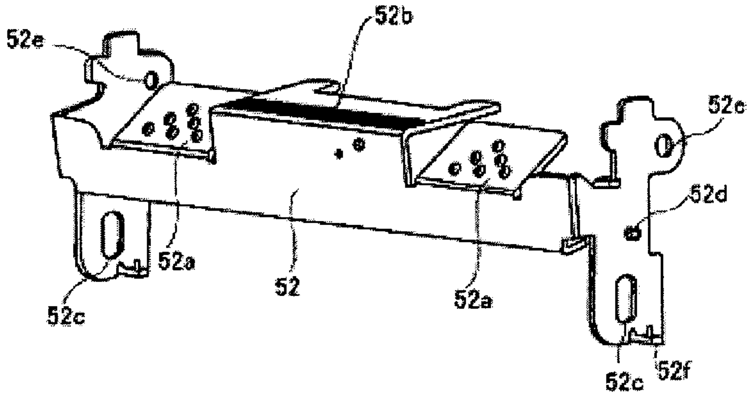
Figure 5D:
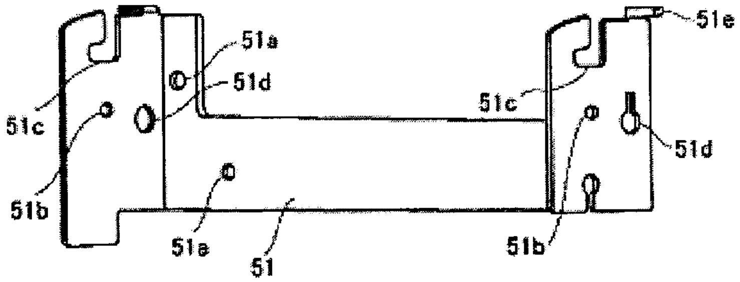
Figure 5E:
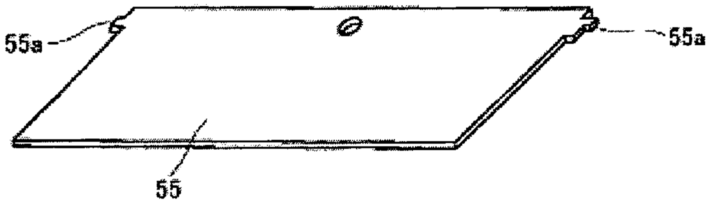

FIG. 4 is a view showing the state in which the front face cover and the movable body are open to insert a paper sheet. By opening the movable body 52 frontward, the mount sheet conveying roller 54 that has been in contact with the platen roller 18 can be separated from the platen roller 18, so it becomes possible to insert a paper sheet through the label peeling unit. As shown in FIG. 4, the inserted continuous label strip 20 is folded over at the fore-end of the label peeling body 53 and is thereby bent considerably. The movable body 52 is closed by pressing the pressing part 52*a* toward the label printer side after inserting the paper sheet. Moreover, by closing the front face cover 3 as shown in FIG. 1, the peeling roller 31 shifts above the label peeling body 53 (FIG. 3) and presses the paper sheet in a direction toward the label peeling body 53 (downward) at a location opposite to the label peeling body 53.

When a paper sheet is conveyed under this condition, a label is peeled off from the mount sheet at the time when the paper sheet passes through the bent portion, and the conveying of the paper sheet is temporarily stopped in the state in which a portion of the label is removably adhered on the mount sheet and retained on the label peeling body 53. Also, a peeling sensor 56 secured to the movable body 52 is used to detect whether or not the label has been removed. A light absorption part 52*b* for absorbing light is formed in the movable body 52 in order to prevent malfunctions of the peeling sensor 56 resulting from the entry of extraneous light or the irregular reflection of light.

While the peeling sensor 56 is detecting the label, the next label is not issued. When the peeled label is removed by the operator or the like and the peeling sensor 56 no longer detects the label, the next label is printed and conveyed to the label peeling unit 50. As shown in FIG. 1, the recessed portion 35 for making removal of the label easy is formed in at least a portion of the front face cover 3. Therefore, the label can be removed easily by inserting a finger into the recessed portion 35, even if the label has a short length along the conveyance direction.

Figure 6A:
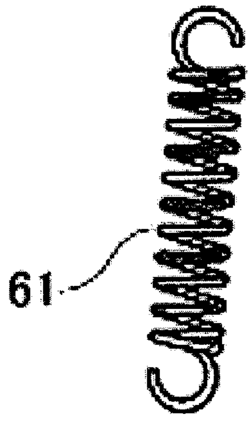
FIG. 6 is a perspective view showing component parts (springs) of the label peeling unit.
Figure 6B:
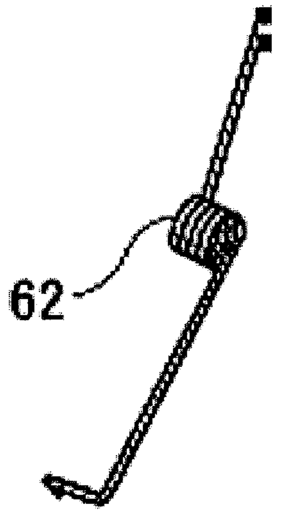
Figure 7:
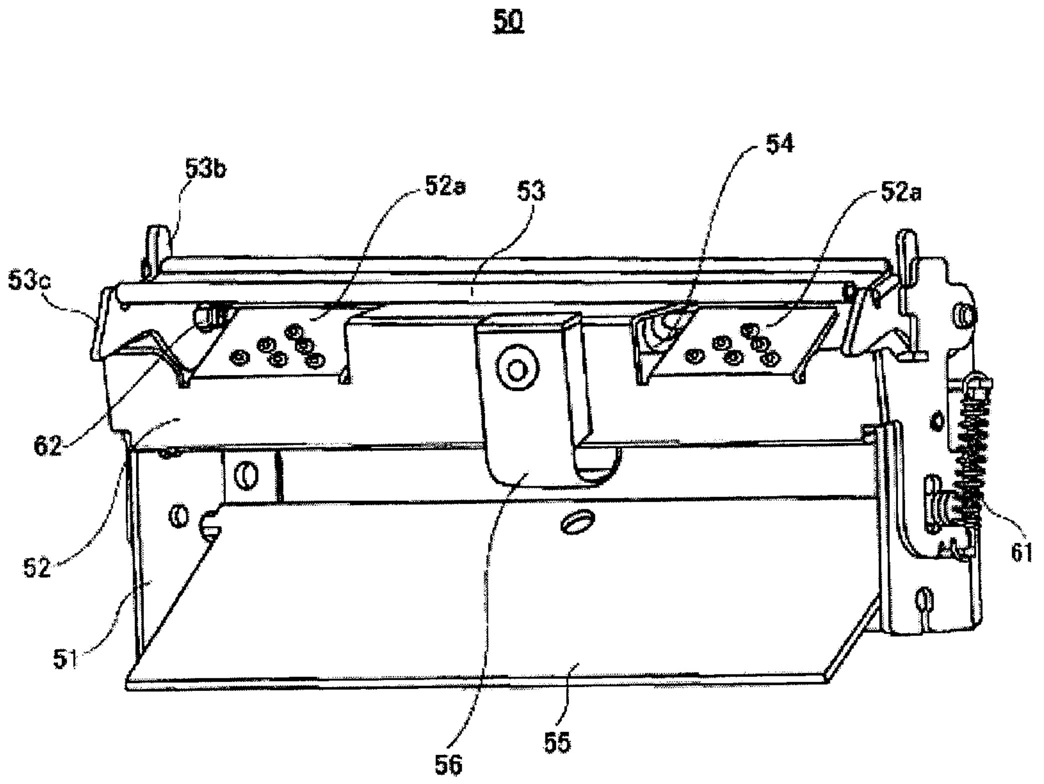
FIG. 7 is a perspective view showing the structure of the assembled label peeling unit.

FIGS. 5(*a*) through 5(*e*) and FIGS. 6(*a*) and (*b*) are perspective views showing a plurality of component parts of the label peeling unit, and FIG. 7 is a perspective view showing the structure of the label peeling unit assembled using the component parts. As shown in FIG. 5(*d*), the attachment body 51 has a plurality of screw holes 51*a* formed therein and used when attached to the case of the label printer, two screw holes 51*b* formed therein and used for attaching the movable body 52, two engaging grooves 51*c* for engaging respectively with two engaging protrusions 52*d* (see FIG. 5(*c*)) of the movable body 52, two mounting holes 51*d* for attaching the guide plate 55 thereto, and an engaging piece 51*e* for engaging with one end of an extension spring 61.

As shown in FIG. 5(*c*), the movable body 52 has the two pressing parts 52*a* on which a plurality of protruding portions are formed thereon as non-slip parts, the light absorption part 52*b* for absorbing light, two elongated holes 52*c* for attaching the movable body 52 slidably to screws (not shown) attached to the screw holes 51*b* of the attachment body 51, two engaging protrusions 52*d* protruding inwardly so as to engage respectively with the two engaging grooves 51*c* of the attachment body 51, shaft holes 52*e* for inserting the shaft of the mount sheet conveying roller 54 (see FIG. 5(*b*)), and an engaging piece 52*f* for engaging with the other end of the extension spring 61.

As shown in FIG. 5(*a*), the label peeling body 53 has shaft grooves 53*a* formed therein for inserting the shaft of the mount sheet conveying roller 54, protruding portions 53*b* formed thereon, and inclined surfaces 53*c* formed thereon. As shown in FIG. 5(*e*), the guide plate 55 has mounting pieces 55*a* formed thereon.

The extension spring 61 shown in FIG. 6(*a*) is hooked between the engaging piece 51*e* of the attachment body 51 and the engaging piece 52*f* of the movable body 52 so as to urge the movable body 52 toward the attachment body 51 side (upward). A torsion spring 62 shown in FIG. 6(*b*) is retained by the shaft of the mount sheet conveying roller 54, so as to urge the label peeling body 53 in a direction away from the movable body 52 (upward).

Referring to FIGS. 5 to 7, mount screws are inserted in the screw holes 51*b* of the attachment body 51 through the elongated holes 52*c* of the movable body 52. At the same time, the engaging protrusions 52*d* of the movable body 52 engage with the engaging grooves 51*c* of the attachment body 51. Thus, the movable body 52 can perform parallel shifting and rotational shifting relative to the attachment body 51. In the state shown in FIG. 7, the engaging protrusions 52*d* are positioned in upper portions of the L-shaped engaging grooves 51*c* by the tension of the extension spring 61, and the movable body 52 is in a closed state with respect to the attachment body 51.

By pressing down the pressing parts 52*a* by the operator, the engaging protrusions 52*d* move to lower portions of the L-shaped engaging grooves 51*c*, the movable body 52 pivots by the tension of the extension spring 61, and the engaging protrusions 52*d* move to the front ends of the lower portions of the L-shaped engaging grooves 51*c*. Thereby, the movable body 52 opens frontward. As a result, the gap between the platen roller 18 and the mount sheet conveying roller 54 supported by the movable body 52 is widened, so inserting a paper sheet through the label peeling unit becomes easy. When the operator presses the pressing parts 52*a* toward the label printer side after inserting the paper sheet, the movable body 52 closes again.

The shaft of the mount sheet conveying roller 54 is inserted through the shaft holes 52*e* of the movable body 52, the shaft grooves 53*a* of the label peeling body 53, and the torsion spring 62. Thereby, the mount sheet conveying roller 54 is attached freely rotatably to the movable body 52, and the label peeling body 53 is attached rotatably to the movable body 52 taking the shaft of the mount sheet conveying roller 54 as the axis of rotation. Further, the label peeling body 53 is urged upwardly (in the opposite direction to the moving direction of the mount sheet) by the torsion spring 62. The mount sheet conveying roller 54 rotates by making contact with the platen roller via a paper sheet so that it conveys the mount sheet and discharges it outside.

In the process of closing the front face cover, both ends of the peeling roller 31 (see FIG. 3) move along the inclined surfaces 53*c* of the label peeling body 53 and resist the upward force by the torsion spring 62. Also, the protruding portions 53*b* of the label peeling body 53 comes into contact with the platen roller retaining portion 17 (see FIG. 3), so the pivoting movement by the torsion spring 62 is restricted. Moreover, by inserting the mounting pieces 55*a* of the guide plate 55 into the mounting holes 51*d* of the attachment body 51, the guide plate 55 is attached freely rotatably to the attachment body 51. The guide plate 55 guides the discharged mount sheet toward the mount sheet discharge port 34 (see FIG. 1).

The invention claimed is:

1. A label peeling unit fitted to a paper sheet conveying device for conveying a continuous label strip in which labels are adhered removably on a mount sheet and for peeling the labels, the label peeling unit comprising:

a case of the paper sheet conveying device;

an attachment body attached to the case;

a movable body configured to be moved in relation to the case while engaging with the attachment body;

a spring positioned and configured to urge the movable body to move between closed and open states thereof and then stopping the movable body in a closed state or in an open state with respect to the attachment body;

a label peeling body mounted on and fitted to the movable body and positioned to contact the mount sheet of the continuous label strip conveyed by the paper sheet conveying device so that the mount sheet is bent, so as to thereby peel a portion of a label from the mount sheet;

a mount sheet conveying roller attached to the movable body freely rotatably and rotating while being in contact with a platen roller of the paper sheet conveying device via the mount sheet, the conveying roller being configured and operative to convey the mount sheet and to discharge the sheet outside, wherein the label peeling body is freely rotatably attached to the movable body, a torsion spring positioned and configured to urge the label peeling body in an opposite direction to a traveling direction of the mount sheet; and the mount sheet conveying roller including a shaft positioned and configured as a rotation axis of the label peeling body.

2. The label peeling unit as set forth in claim 1, wherein the attachment body has a screw hole and an engaging groove formed therein, the movable body has an elongated hole and an engaging protrusion, a screw is inserted into the screw hole of the attachment body through the elongated hole of the movable body, and the engaging protrusion of the movable body engages with the engaging groove of the attachment body, such that the movable body is capable of parallel shifting and rotational shifting relative to the attachment body.

3. The label peeling unit as set forth in claim 1, wherein the movable body is provided with at least one pressing part to be pressed down when opening the movable body to the open state, the pressing part having a plurality of protruding portions formed thereon.

4. The label peeling unit as set forth in claim 1, wherein the mount sheet conveying roller is attached freely rotatably to the moveable body and is rotated by contact with the platen roller.

5. A label printer for conveying a continuous label strip in which labels are adhered removably to a mount sheet, and performing printing on the labels, the label printer comprising:

a case having an enclosing unit for enclosing the continuous label strip coiled in a roll form;

a platen roller positioned such that a motor in the case is configured to rotate and drive the platen roller to thereby convey the continuous label strip;

a print head configured and operative and located for printing on labels while sandwiching the continuous label strip between the print head and the platen roller;

a front face cover attached openably/closably to the case; and a label peeling unit as set forth in claim 1, the label peeling unit attached to the case within the front face cover.

6. The label printer as set forth in claim 5, further comprising a peeling roller attached freely rotatably to the front face cover and configured and operative for pressing the continuous label strip in a direction toward the label peeling body at a location opposing the label peeling body.

7. The label printer as set forth in claim 5, further comprising a recessed portion formed in at least a portion of the front face cover and configured and operative for facilitating removal of the labels from the case.

* * * * *

UNITED STATES PATENT AND TRADEMARK OFFICE

CERTIFICATE OF CORRECTION

PATENT NO. : 8,708,022 B2
APPLICATION NO. : 12/523751
DATED : April 29, 2014
INVENTOR(S) : Hosono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this
Twenty-ninth Day of September, 2015

Michelle K. Lee
*Director of the United States Patent and Trademark Office*